United States Patent [19]
Carmien

[11] Patent Number: 5,493,758
[45] Date of Patent: Feb. 27, 1996

[54] EXTENSION POLE

[76] Inventor: Joseph A. Carmien, 525 N. Maple Dr., Beverly Hills, Calif. 90210

[21] Appl. No.: 374,194

[22] Filed: Jan. 18, 1995

Related U.S. Application Data

[63] Continuation of Ser. No. 342,364, Nov. 18, 1994, abandoned, which is a continuation-in-part of Ser. No. 45,464, Apr. 8, 1993, Pat. No. 5,421,931.

[51] Int. Cl.⁶ .................................................... B25G 1/04
[52] U.S. Cl. ................ 16/115; 16/DIG. 25; 16/DIG. 40; 15/144.3; 30/340
[58] Field of Search .............................. 16/115, DIG. 24, 16/DIG. 25, DIG. 40, DIG. 41; 15/144.3, 144.4; 30/341, 248, 249, 340; 403/331, 380

[56] References Cited

U.S. PATENT DOCUMENTS

| | | |
|---|---|---|
| Re. 32,364 | 2/1987 | Carmien . |
| T101,401 | 1/1982 | Zion . |
| 843,590 | 2/1907 | Dunn et al. ............................ 15/144.3 |
| 980,183 | 8/1909 | Jenkins ............................... 16/DIG. 25 |
| 1,821,481 | 9/1931 | Schempp ............................... 15/144.3 |
| 2,168,121 | 8/1939 | French ................................. 15/144.3 |
| 2,571,717 | 10/1951 | Howald et al. . |
| 3,069,190 | 12/1962 | Henson ................................. 16/114 R |
| 3,291,878 | 12/1966 | Biggs . |
| 3,378,884 | 4/1968 | Meteer . |
| 3,567,541 | 2/1971 | Kaczerginski . |
| 3,619,009 | 11/1971 | O'Leary . |
| 3,835,535 | 9/1974 | Robison et al. ..................... 16/DIG. 25 |
| 4,063,838 | 12/1977 | Michael . |
| 4,236,386 | 12/1980 | Yates et al. . |
| 4,238,540 | 12/1980 | Yates et al. . |
| 4,300,321 | 11/1981 | Preis et al. . |
| 4,440,593 | 4/1984 | Goldsworthy . |
| 4,469,541 | 9/1984 | Goldsworthy . |
| 4,554,705 | 11/1985 | Murray ................................ 16/DIG. 18 |
| 4,570,988 | 2/1986 | Carmien . |
| 4,605,254 | 8/1986 | Carmien . |
| 4,639,029 | 1/1987 | Kolonia . |
| 4,673,541 | 6/1987 | Watanabe et al. . |
| 4,739,536 | 4/1988 | Badera et al. . |
| 4,752,313 | 6/1988 | Allaire et al. . |
| 4,770,834 | 9/1988 | Nakasone et al. . |
| 4,772,438 | 9/1988 | Watanabe et al. . |
| 4,803,819 | 2/1989 | Kelsey . |
| 4,820,366 | 4/1989 | Beever et al. . |
| 4,958,407 | 9/1990 | Johnson ............................. 16/DIG. 25 |
| 5,211,669 | 5/1993 | Bonnes et al. ..................... 16/DIG. 18 |
| 5,264,060 | 11/1993 | Lambing et al. . |

FOREIGN PATENT DOCUMENTS 2831318  2/1979  Germany .

Primary Examiner—Maurina T. Rachuba
Assistant Examiner—Donald M. Gurley
Attorney, Agent, or Firm—Kelly, Bauersfeld & Lowry

[57] ABSTRACT

An extension pole is provided for use in handling and manipulating a tool head, such as a tree pruner or other selected implement. The pole comprises a base section and an extension section defining a mated pair of generally planar side faces retained in face-to-face relation by a first slide cuff secured to a distal end of the base section for slide-fit reception of the extension section, and a second slide cuff secured to a proximal end of the extension section for slide-fit reception of the base section. One or more lock keys are carried by one of the pole sections for key-lock engagement with a longitudinally extending pattern of detents formed in the side face of the other pole section. At least one band clamp is releasibly secured about the pole sections to retain the lock keys in engagement with the detent pattern, thereby releasibly locking the two pole sections in a selected position of longitudinal adjustment. Release or loosening of the band clamp permits sufficient movement between the pole sections, within the slide cuffs, to accommodate retraction of the lock keys from the detent pattern and longitudinal adjustment of the extension section relative to the base section.

23 Claims, 2 Drawing Sheets

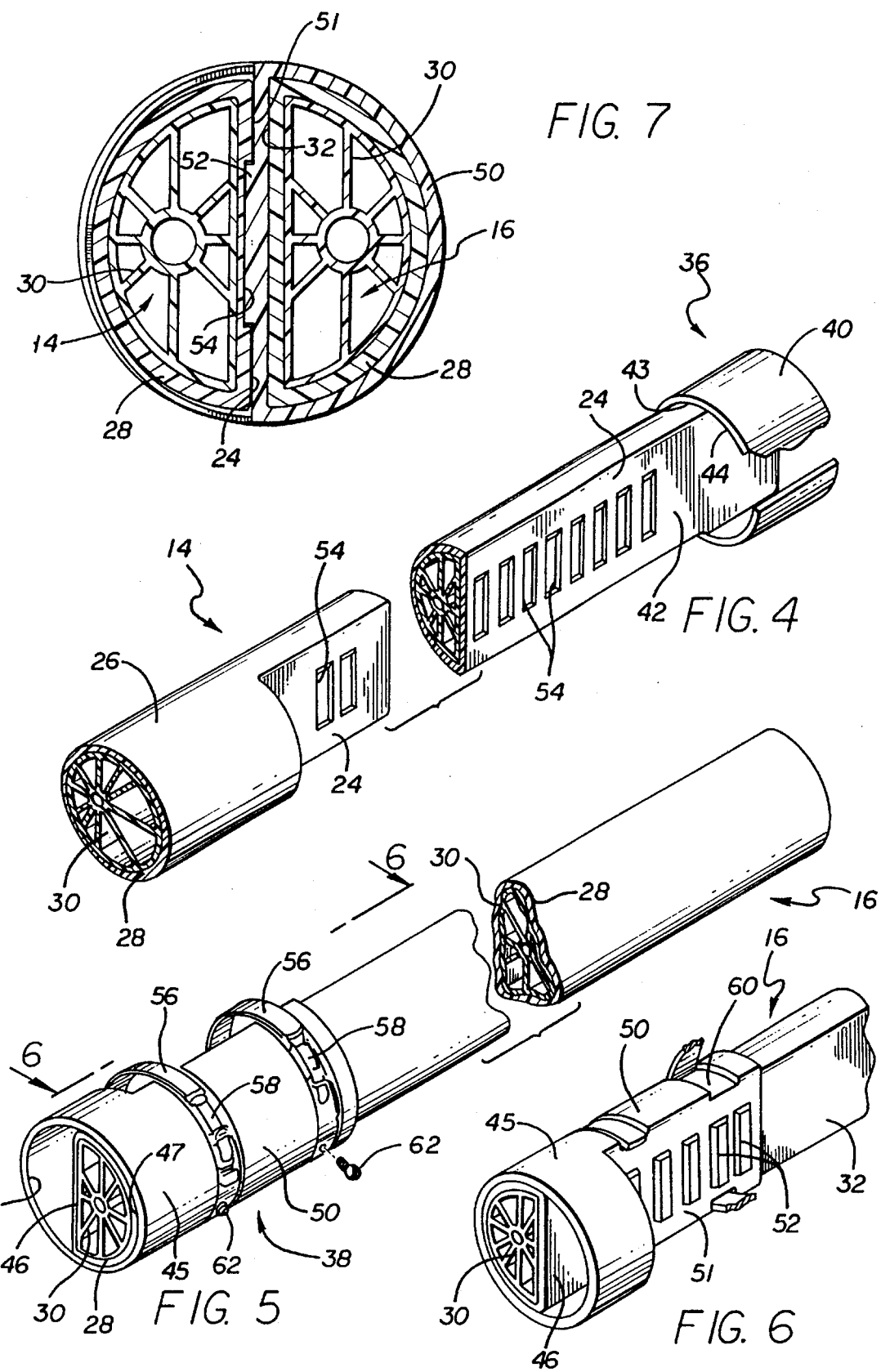

EXTENSION POLE

RELATED APPLICATION

This is a continuation of U.S. patent application Ser. No. 08/342,364, filed Nov. 18, 1994, now abandoned, which is a continuation-in-part of U.S. patent application Ser. No. 08/045,464, filed Apr. 8, 1993 and entitled PROCESS FOR MANUFACTURING REINFORCED ROD ASSEMBLIES, INCLUDING TOOL HANDLES now U.S. Pat. No. 5,421,931.

BACKGROUND OF THE INVENTION

This invention relates generally to an extension pole for use in a range of applications, such as handling and manipulating a tool head. More specifically, the present invention relates to an improved extension pole adapted to be constructed from relatively lightweight and economical components while providing high strength and structural rigidity in combination with relatively quick and easy longitudinal extension and retraction.

Longitudinally adjustable utility poles are well-known and widely used to perform many different tasks wherein an extended reach is desirable. For example, extension poles are often used by workmen to manipulate a pruner tool head used to trim branches from trees and shrubs. Similar extension poles are used to manipulate paint rollers or, in conjunction with swimming pool applications, to manipulate brushes, leaf baskets and the like, used for cleaning and maintenance.

Telescopic tubular pole sections have been used in combination with twist lock devices for releasibly retaining the pole sections in a selected extended or retracted position of adjustment. Additionally, pivot brackets have been provided to interconnect multiple pole sections in a manner permitting the pole sections to be unfolded and interlocked in an extended configuration. In general terms, however, extension poles of this type have been relatively costly and undesirably heavy, or otherwise have not provided a desired level of structural stiffness in the extended configuration.

There exists, therefore, a need for an improved construction for an extension pole, wherein relatively lightweight and economically produced pole sections are adapted to be extended and retracted quickly and easily while providing a high degree of structural stiffness and integrity. The present invention fulfills this need and provides other related advantages.

SUMMARY OF THE INVENTION

An improved extension pole constructed in accordance with the invention comprises interfitting base and extension pole sections having generally planar side faces retained in face-to-face relation by a pair of slide cuffs. One of the slide cuffs is mounted on the pole section and slidably supports the extension pole section, whereas the other slide cuff is mounted on the extension section and slidably supports the base section. Lock means are provided for releasibly locking and clamping the side faces of the base and extension sections against each other to correspondingly lock the two pole sections in a selected position of longitudinal adjustment.

In a preferred form of the invention, the side faces of the base and extension pole sections have a substantially flat or planar shape oriented generally in a vertical plane. A first slide cuff is secured to a distal end of the base section and defines a sleeve for smooth slide-fit reception of the extension section. A second slide cuff is secured generally to a proximal end of the extension section and includes a sleeve for relatively smooth slide-fit reception of the base section. The two slide cuffs thus support the base and extension pole sections for longitudinal sliding displacement with their side faces retained in face-to-face relation.

The lock means comprises at least one lock key protruding laterally from the side face of one of the two pole sections for engaging a longitudinally extending pattern of detents formed in the side face of the other pole section. In a preferred form, the lock key or keys are formed on a key plate provided as a blade-shaped element on the second slide cuff at a position interposed between the side faces of the two pole sections. The lock keys on the key plate are engageable with a pattern of detents formed in the side face of the base pole section. One or more circumferential and releasible band clamps are carried by the second slide cuff and can be tightened to hold the pole sections with their side faces in clamped relation, with the lock keys engaged into adjacent detents in the base pole section. With this configuration, the band clamps lock the extension section against longitudinal displacement relative to the base section. However, the band clamps can be released, with the slide cuffs providing sufficient clearance to accommodate retraction of the lock keys from the detent pattern so that the extension pole section can be longitudinally moved relative to the base pole section to an alternative position of longitudinal adjustment.

The base and extension pole sections both comprise a relatively lightweight and economically constructed tool handle component defined by a fiber-resin jacket formed by pultrusion over a lightweight filler core. In a preferred form and method, these components are produced with a generally semicircular or half-round cross section, according to the apparatus and method disclosed in U.S. Ser. No. 045,464, filed Apr. 8, 1993, which is incorporated by reference herein.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 4 is an enlarged fragmented and exploded perspective view showing construction details of a base pole section which forms a portion of the extension pole;

FIG. 5 is an enlarged fragmented and exploded perspective view showing construction details of an extension pole section which forms a portion of the extension pole and is utilized with the base pole section of FIG. 4;

FIG. 6 is an enlarged fragmented perspective view of a portion of the extension pole section, as viewed generally along the line 6—6 of FIG. 5; and FIG. 7 is an enlarged transverse sectional view taken generally on the line 7—7 of FIG. 3.

DETAILED DESCRIPTION OF THE PREFERRED EMBODIMENT

Figure 1:
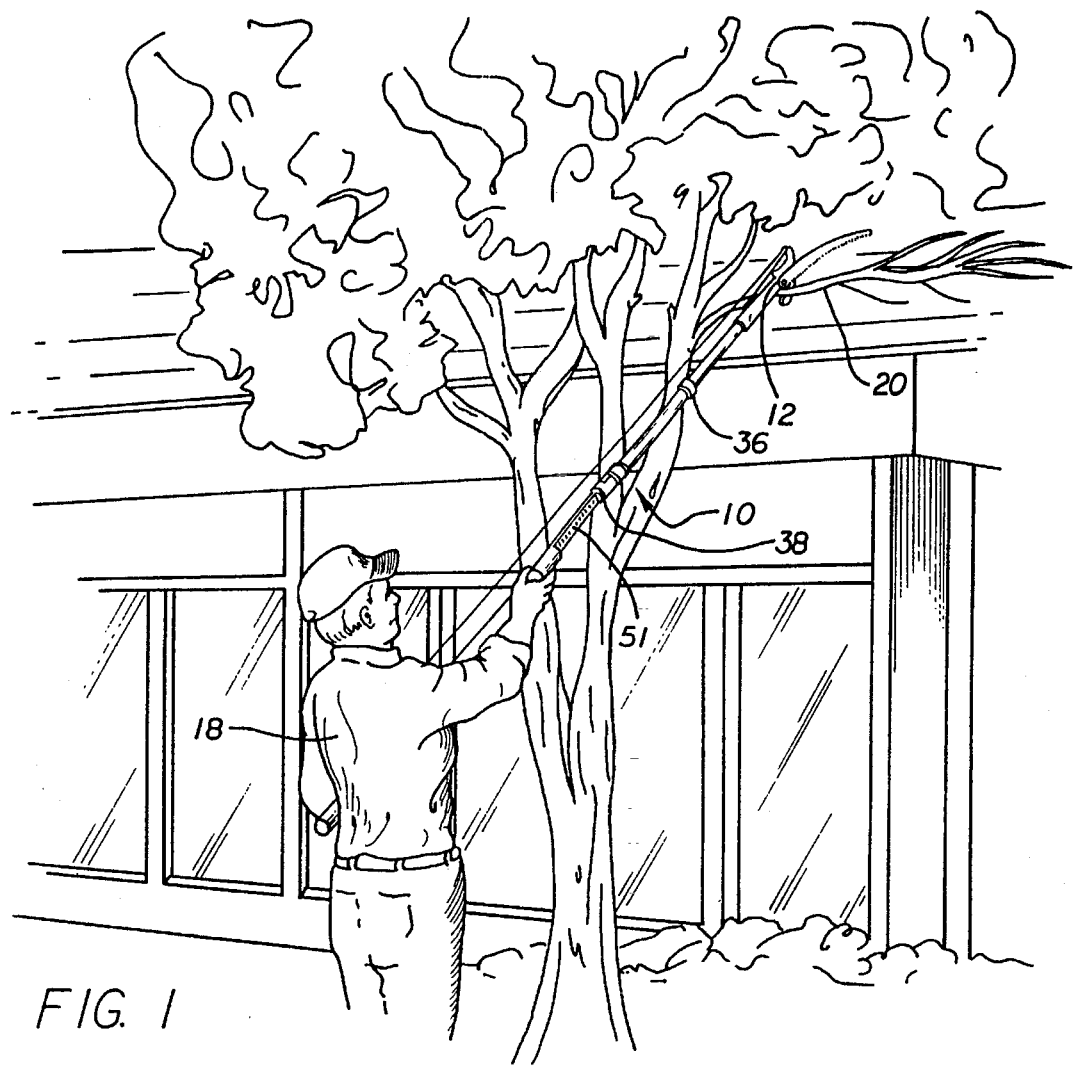
FIG. 1 is a pictorial illustration showing an extension pole embodying the novel features of the invention for use in a tree pruner application.

As shown in the exemplary drawings, an extension pole referred to generally by the reference numeral 10 is provided for use in handling and manipulating a tool head 12, such as the illustrative tree pruner head shown in FIG. 1. The extension pole comprises a pair of relatively lightweight and economically constructed pole sections 14 and 16 adapted for quick and easy adjustment between a retracted position (FIG. 2) and an extended position (FIG. 3). In a selected position of longitudinal adjustment, the two pole sections 14 and 16 can be securely locked to provide a high degree of structural stiffness and integrity.

The improved extension pole 10 of the present invention is shown in FIG. 1 in a typical tree pruner application, wherein the pole section 14 comprises a base section adapted to be held and manipulated by a workman 18. By contrast, the pole section 16 comprises an extension section adapted for longitudinal sliding displacement relative to the base section 14 to a selected position of longitudinal adjustment, thereby providing the workman 18 with the appropriate degree of extended reach to perform a desired task such as trimming a branch 20 from a tree. In this regard, the extension pole 10 of the present invention may be used in a wide range of different applications wherein manipulation and handling of a tool head 12 or other selected implement is desired in the course of performing a particular task. The lengths of the two pole sections 14 and 16 may, of course, be varied according to the requisite extension distance.

Figure 2:
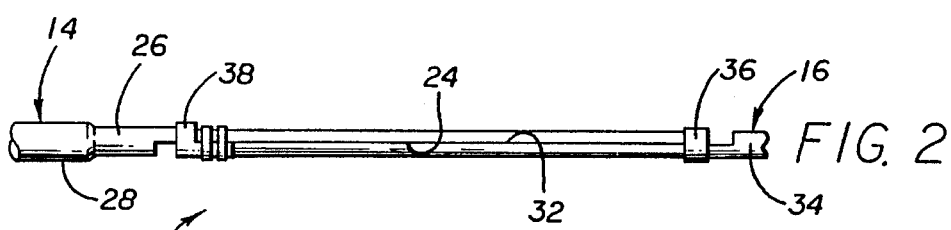
FIG. 2 is a fragmented top plan view showing the extension pole of FIG. 1 in a retracted configuration.
Figure 3:
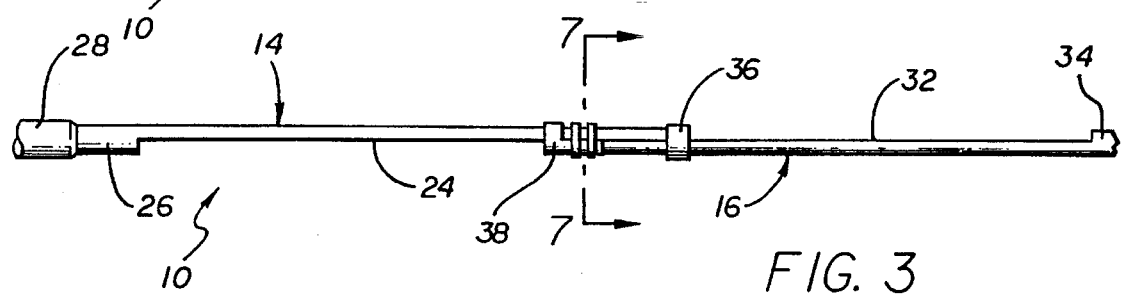
FIG. 3 is a fragmented top plan view showing the extension pole of FIG. 1 in an extended configuration.

As shown in FIGS. 2–4, the base pole section 14 has an elongated adjustment segment defined by a semicircular or half-round cross sectional shape to include a laterally presented side face 24 having a generally planar or flat shape. This adjustment segment of the base section 14 is shown at one end of a handle segment 26 having a convenient size and shape, such as a full-round cross section, for easy manual grasping and handling by the workman 18. Alternately, the half-round adjustment segment of the base section 14 may extend the entire length thereof. In either case, the entire base section 14, including the flat-sided adjustment segment and the handle segment 26, is preferably constructed as a unitized component to include a fiber-resin outer jacket 28 (FIG. 4) formed as by pultrusion about a lightweight filler core 30. In this regard, the base pole section 14, including the adjustment segment with noncircular cross section, is constructed in accordance with the apparatus and method disclosed in U.S. patent application Ser. No. 045,464, filed Apr. 8, 1993, now U.S. Pat. No. 5,421,931, which is incorporated by reference herein. In addition, the lightweight filler core 30 may be used in combination with stronger reinforcing core segments (not shown) installed within the fiber-resin jacket at strategic locations whereat higher loading is anticipated in the course of normal tool use.

The extension pole section 16 is similarly constructed to include an elongated adjustment segment of generally semicircular or half-round cross section defining a substantially planar or flat side face 32 for mating and slide-fit positioning in face-to-face relation with the side face 24 on the base section 14. As shown in FIGS. 1–3, this flat-sided adjustment segment of the extension section 16 may be formed in a unitized construction with a distal end head segment 34 of appropriate full-round cross section for convenient attachment to the tool head 12. Once again, the preferred pole section construction comprises a fiber-resin jacket 28 formed as by pultrusion on a filler core 30, in accordance with the above-cited U.S. patent application Ser. No. 045,464.

A pair of slide-fit cuffs 36 and 38 are mounted on the two pole sections 14 and 16 to retain the flat side faces 24 and 32 in generally mated, face-to-face relation. More specifically, the first slide cuff 36 comprises a circular sleeve 40 (FIG. 4) having a central diametrically extending divider wall 42 to subdivide the interior of the sleeve into a pair of semicircular passages 43 and 44. This slide cuff 36 is fitted over the outboard or distal end of the base pole section 14 which is then suitably attached to the sleeve 40 within the passage 43, as viewed in FIG. 4, as by means of an adhesive. The half-round adjustment segment of the extension pole section 16 is received in a slide-fit manner through the other sleeve passage 44.

The second slide cuff 38 also comprises a generally cylindrical sleeve 45 having a central diametrically extending divider wall 46 to subdivide the sleeve interior into a pair of adjacent half-round passages 47 and 48. This slide cuff 38 is mounted by an adhesive or the like onto the proximal or inboard end of the extension pole section 16, with the pole section 16 extending through the sleeve passage 47. The other sleeve passage 48 receives the adjustment segment of the base section 14 in a slide-fit manner. With this configuration, the two slide cuffs 36 and 38 are each attached to a respective one of the two pole sections 14 and 16, and respectively support the other pole section 14, 16 in a longitudinally slidable manner, with the flat side faces 24 and 32 retained in face-to-face relation. Sliding movement of the extension section 16 relative to the base section 14 effectively adjusts the pole 10 between the retracted and extended positions, as viewed in FIGS. 2 and 3.

As shown best in FIGS. 5 and 6, the second slide cuff 38 also includes integral lock means for releasibly locking and clamping the two pole sections 14 and 16 in a selected position of longitudinal adjustment. More particularly, the illustrative lock means comprises a hollow and generally semicircular sheath 50 formed as an extension of the cuff sleeve 45 to encase a short segment of the extension pole section 16 at the proximal end thereof. This semicircular sheath 50 defines a blade-shaped lock plate 51 (FIG. 6) disposed or interposed between the flat side faces 24 and 32 of the two pole sections. A longitudinally spaced series of laterally protruding lock keys 52 are formed in the lock plate 50. Importantly, these lock keys 52 have a size and shape, and are formed in a longitudinal spacing for registered engagement with longitudinally extending detents 54 formed in a pattern to extend substantially the length of the flat side face 24 of the base pole section 14.

The sleeves 40 and 45 of the two slide cuffs 36 and 38 accommodate sufficient lateral retraction of the two side faces 24, 32 with respect to each other, to permit longitudinal positional adjustment of the extension section 16 relative to the base section 14. However, when a desired position of longitudinal adjustment is reached, the side faces 24, 32 are clamped tightly against each other, with the lock keys 52 seated into aligned ones of the detents 54, thereby securely locking and retaining the pole sections 14 and 16 in the selected position of longitudinal adjustment. This clamping function is achieved by means of a pair of circumferential band clamps 56 having releasible over-center latches 58. As shown, the band clamps 56 are seated within preformed grooves 60 in the exterior of the sheath 50, to retain the clamps on the second slide cuff 38 at a position wrapped circumferentially about the lock plate 51 and the lock keys 52 formed therein. If desired, each band clip 56 can be attached to the slide cuff 38 by a suitable fastener 62 to prevent inadvertent removal of the band clamps from the slide cuff.

Accordingly, when the band clamps 56 are released or loosened, the pole sections 14 and 16 may be longitudinally adjusted quickly and easily with respect to each other. When the desired position of longitudinal adjustment is reached, the band clamps 56 are quickly and easily tightened for purposes of securely locking the pole sections against longitudinal displacement. In this locked configuration, the assembled pole sections 14 and 16 provide a lightweight extension pole structure having substantial structural rigidity and integrity. In this regard, this structural integrity with extended reach is significantly enhanced when, as shown in the accompanying drawings, the clamped side faces 24 and 32 are aligned in a generally vertical plane during normal orientation and use of the tool head. With this arrangement, the lightweight pole sections have a high structural load-bearing capacity in the vertical direction, to further enhance the structural integrity of the extension pole.

The improved extension pole 10 of the present invention is particularly suited for construction from lightweight and economical components, such as the fiber-resin jacket with internal filler core construction as described with respect to the base and extension pole sections. The two slide cuffs 36 and 38 are also adapted for economical manufacture as lightweight molded plastic components or the like.

A variety of further modifications and improvements to the improved extension pole of the present invention will be apparent to those skilled in the art. Accordingly, no limitation on the invention is intended by way of the foregoing description and accompanying drawings, except as set forth in the appended claims.

What is claimed is:

1. An extension pole, comprising:

a base section having a laterally presented and generally planar side face;

an extension section having a laterally presented and generally planar side face;

slide support means for interconnecting said base and extension sections with their respective side faces disposed in mated face-to-face relation, and to permit longitudinal sliding displacement of said extension section between an extended position and a retracted position relative to said base section, said slide support means comprising a first slide cuff longitudinally fixed to said base section generally at an end thereof and including a sleeve slidably receiving and supporting said extension section, and a second slide cuff longitudinally fixed to said extension section generally at an end thereof and including a sleeve slidably receiving and supporting said base section; and lock means for releasibly clamping said base and extension sections with their respective side faces in face-to-face relation, to releasibly lock said base and extension sections in a selected position of longitudinal adjustment.

2. The extension pole of claim 1, wherein said base section includes a handle segment and an adjustment segment protruding from one end of said handle segment, said generally planar side face being formed on said adjustment segment of said base section.

3. The extension pole of claim 2, wherein said extension section includes an adjustment segment having said generally planar side face formed thereon, and a tool head segment protruding from one end of said adjustment segment of said extension section.

4. The extension pole of claim 1, wherein said lock means comprises a band clamp extending circumferentially about said base and extension sections.

5. The extension pole of claim 4, wherein said lock means further includes a longitudinally extending pattern of laterally open detents formed in the generally planar side face of one of said base and extension sections, and at least one laterally protruding key carried on the other of said base and extension sections for reception into a selected one of said detents.

6. The extension pole of claim 1, wherein said lock means comprises a longitudinally extending pattern of laterally open detents formed in the generally planar side face of said base section, at least one laterally protruding lock key carried by said extension section for reception into a selected one of said detents, and clamp means for retaining said side faces in clamped face-to-face relation with said lock key received into said selected one of said detents.

7. The extension pole of claim 6, wherein said lock key is on said second slide cuff.

8. The extension pole of claim 6, wherein said second slide cuff includes a key plate interposed between said side faces of said base and extension sections, said at least one lock key being formed on said key plate.

9. The extension pole of claim 8, wherein said clamp means includes at least one band clamp carried about said base and extension sections in surrounding relation to said key plate.

10. The extension pole of claim 9, wherein said second cuff further includes an externally open groove for seated reception and location of said band clamp.

11. The extension pole of claim 10, further including means for connecting said band clamp to said second cuff within said groove.

12. The extension pole of claim 1, wherein said base and extension sections have a generally half-round cross sectional shape.

13. The extension pole of claim 12, wherein side faces of said base and extension sections are disposed generally in a vertical plane during normal use of said pole.

14. The extension pole of claim 1, wherein said base and extension sections each comprise an elongated fiber-resin jacket carried about a filler core.

15. An extension pole, comprising:

a base section and an extension section respectively defining a pair of laterally presented side faces;

slide support means for slidably interconnecting said base and extension sections with their respective side faces disposed in mated face-to-face relation, and to permit longitudinal sliding displacement of said extension section between an extended position and a retracted position relative to said base section, said slide support means comprising a first slide cuff fixedly connected to said base section generally at an end thereof and including a sleeve slidably receiving and supporting said extension section, and a second slide cuff fixedly connected to said extension section generally at an end thereof and including a sleeve slidably receiving and supporting said base section; and lock means for releasibly clamping said base and extension sections with their respective side faces in face-to-face relation to releasibly lock said base and extension sections in a selected position of longitudinal adjustment, said lock means comprising a longitudinally extending pattern of laterally open detents formed in the side face of one of said base and extension sections, and at least one laterally protruding key carried on the other of said base and extension sections for reception into a selected one of said detents.

16. An extension pole, comprising:

a base section having a generally semicircular cross sectional shape defining a substantially planar side face;

an extension section having a generally semicircular cross sectional shape defining a substantially planar side face;

a first slide cuff connected to said base section and including a sleeve providing means for slide-fit reception and support of said extension section;

a second slide cuff mounted to said extension section and including a sleeve providing means for slide-fit reception and support of said base section;

said first and second slide cuffs supporting said base and extension sections with their respective side faces in substantially mated face-to-face relation, to permit longitudinal sliding movement of said extension section relative to said base section to a selected position of longitudinal adjustment;

said side face of said base section defining a longitudinally extending pattern of detents;

at least one lock key carried by said extension section and seated into a selected one of said detents; and clamp means for releasingly clamping said base and extension sections with their respective side faces in face-to-face relation to retain said lock key in said selected detent and thereby lock said extension section in a selected position of longitudinal adjustment.

17. The extension pole of claim 16, wherein said lock key is on said second slide cuff.

18. The extension pole of claim 16, wherein said second slide cuff includes a key plate interposed between said side faces of said base and extension sections, said at least one lock key being formed on said key plate.

19. The extension pole of claim 18, wherein said clamp means includes at least one band clamp carried about said base and extension sections in surrounding relation to said key plate.

20. The extension pole of claim 19, wherein said second cuff further includes an externally open groove for seated reception and location of said band clamp.

21. An extension pole, comprising:

a base section having a laterally presented and generally planar side face;

an extension section having a laterally presented and generally planar side face;

slide support means for interconnecting said base and extension sections with their respective side faces disposed in mated face-to-face relation, and to permit longitudinal sliding displacement of said extension section between an extended position and a retracted position relative to said base section; and lock means for releasibly clamping said base and extension sections with their respective side faces in face-to-face relation, to releasibly lock said base and extension sections in a selected position of longitudinal adjustment, said lock means comprising a band clamp extending circumferentially about said base and extension sections, and a longitudinally extending pattern of laterally open detents formed in the generally planar side face of one of said base and extension sections, and at least one laterally protruding key carried on the other of said base and extension sections for reception into a selected one of said detents.

22. An extension pole, comprising:

a base section having a laterally presented and generally planar side face;

an extension section having a laterally presented and generally planar side face;

slide support means for interconnecting said base and extension sections with their respective side faces disposed in mated face-to-face relation, and to permit longitudinal sliding displacement of said extension section between an extended position and a retracted position relative to said base section, said slide support means comprising a pair of slide cuffs each longitudinally fixed to a respective one of said base and extension sections and slidably supporting the other of said base and extension sections; and lock means for releasibly clamping said base and extension sections with their respective side faces in face-to-face relation, to releasibly lock said base and extension sections in a selected position of longitudinal adjustment.

23. An extension pole, comprising:

a base section and an extension section respectively defining a pair of laterally presented side faces;

slide support means for slidably interconnecting said base and extension sections with their respective side faces disposed in mated face-to-face relation, and to permit longitudinal sliding displacement of said extension section between an extended position and a retracted position relative to said base section, said slide support means comprising a first slide cuff fixedly connected to said base section generally at an end thereof and including a sleeve slidably receiving and supporting said extension section, and a second slide cuff fixedly connected to said extension section generally at an end thereof and including a sleeve slidably receiving and supporting said base section; and lock means for releasibly clamping said base and extension sections with their respective side faces in face-to-face relation to releasibly lock said base and extension sections in a selected position of longitudinal adjustment.

\* \* \* \* \*